United States Patent
Owen

(10) Patent No.: US 7,025,841 B2
(45) Date of Patent: Apr. 11, 2006

(54) ULTRASONIC APPARATUS WITH NON-ROTATING HORN AND ROTATING ANVIL FOR WELDING PLASTIC PARTS

(75) Inventor: Kevin Owen, Flowery Branch, GA (US)

(73) Assignee: Illinois Tool Works Inc., Glenview, IL (US)

( * ) Notice: Subject to any disclaimer, the term of this patent is extended or adjusted under 35 U.S.C. 154(b) by 31 days.

(21) Appl. No.: 10/436,300

(22) Filed: May 12, 2003

(65) Prior Publication Data
US 2004/0226645 A1    Nov. 18, 2004

(51) Int. Cl.
B29C 65/08    (2006.01)

(52) U.S. Cl. .................. 156/64; 156/73.1; 156/290; 156/580.2

(58) Field of Classification Search .......... 156/64, 156/73.1, 290, 350, 359, 361, 378, 580.1, 156/580.2, 581, 582, 583.1, 583.5, 91, 555; 264/442, 443, 445; 425/174.2
See application file for complete search history.

(56) References Cited

U.S. PATENT DOCUMENTS

| | | | | |
|---|---|---|---|---|
| 3,562,041 | A | 2/1971 | Robertson | 156/73 |
| 4,402,115 | A | 9/1983 | Moertel | 24/205.16 R |
| 4,517,790 | A * | 5/1985 | Kreager | 53/552 |
| 4,605,454 | A * | 8/1986 | Sayovitz et al. | 156/73.1 |
| 5,110,403 | A | 5/1992 | Ehlert | 156/580.1 |
| 5,707,470 | A | 1/1998 | Rajala et al. | 156/73.2 |
| 5,711,847 | A | 1/1998 | Rajala et al. | 156/580.2 |
| 5,919,539 | A | 7/1999 | Bisbis et al. | 428/57 |
| 6,022,443 | A | 2/2000 | Rajala et al. | 156/302 |
| 6,120,629 | A * | 9/2000 | Shannon et al. | 156/73.1 |
| 6,291,039 | B1 | 9/2001 | Combe et al. | 428/35.2 |
| 6,406,468 | B1 | 6/2002 | Dilnik et al. | 604/391 |
| 6,471,804 | B1 * | 10/2002 | Tennby et al. | 156/73.1 |

(Continued)

FOREIGN PATENT DOCUMENTS

DE    29814704 U1    12/1998

(Continued)

OTHER PUBLICATIONS

Textiles & Films, Branson Ultrasonics, 4 pages downloaded from www.bransonultrasonics.com on Jul. 14, 2002 (see Radial Actuator on p. 3).

(Continued)

Primary Examiner—James Sells
(74) Attorney, Agent, or Firm—Ostrager Chong Flaherty & Broitman P.C.

(57) ABSTRACT

A method and an apparatus for ultrasonically welding plastic parts together. The ultrasonic welding apparatus includes: an air cylinder having a piston rod; an ultrasonic horn substantially rigidly coupled to an end of the piston rod and having a distal end; a rotary anvil having an axis of rotation generally perpendicular to an axis of the piston rod and comprising a periphery; a transducer for converting electric potential differences into ultrasound wave energy, the horn being acoustically coupled to the transducer; and drive means for causing the anvil to rotate. The distal end of the horn confronts the periphery of the anvil throughout rotation of the anvil. On one application, interlocked zipper strips are passed through a gap between the distal end of the horn and the periphery of the anvil. The anvil periphery has a plateau that presses the zipper against the distal end of the horn. The transducer is energized in synchronism with the plateau being opposed to the distal end of the horn.

12 Claims, 3 Drawing Sheets

U.S. PATENT DOCUMENTS

| | | |
|---|---|---|
| 6,547,903 B1 | 4/2003 | McNichols et al. ............ 156/64 |
| 6,592,711 B1 * | 7/2003 | Kubik ..................... 156/580.1 |
| 6,780,263 B1 * | 8/2004 | Delisle ........................ 156/64 |
| 2002/0062902 A1 | 5/2002 | Couillard et al. .......... 156/73.1 |
| 2003/0093971 A1 | 5/2003 | Terminella et al. ........ 53/133.4 |

FOREIGN PATENT DOCUMENTS

| | | |
|---|---|---|
| EP | 1163998 A | 12/2001 |
| FR | 2787058 | 6/2000 |
| WO | WO 98/08739 | 3/1998 |
| WO | WO 98/49062 | 11/1998 |

OTHER PUBLICATIONS

Patent Abstracts of Japan, vol. 2000, No. 12, Jan. 3, 2001 & JP 2000 238135 A (Ishino Torao), Sep. 5, 2000.

* cited by examiner

ULTRASONIC APPARATUS WITH NON-ROTATING HORN AND ROTATING ANVIL FOR WELDING PLASTIC PARTS

BACKGROUND OF THE INVENTION

This invention generally relates to methods and apparatus for welding plastic parts using ultrasonic wave energy. In particular, the invention relates to methods and apparatus for pre-sealing or stomping two interlocked zipper strips at spaced intervals along the zipper.

Reclosable bags are finding ever-growing acceptance as primary packaging, particularly as packaging for foodstuffs such as cereal, fresh vegetables, snacks and the like. Such bags provide the consumer with the ability to readily store, in a closed, if not sealed, package any unused portion of the packaged product even after the package is initially opened.

Reclosable plastic zipper assemblies are useful for sealing thermoplastic pouches or bags. Typically, the plastic zippers include a pair of interlockable profiled members that form a closure. The profiles in plastic zippers can take on various configurations, e.g. interlocking rib and groove elements having so-called male and female profiles, interlocking alternating hook-shaped closure elements, etc.

Machinery for continuously manufacturing zippered bags at high speed is well known. A typical pre-made bag system comprises a station for continuously paying out a web of bag making film from a roll; a folding mechanism for folding the film; a station for continuously paying out zipper and inserting the zipper between the opposing walls of the folded bag making film in the machine direction; a station for continuously sealing (e.g., by conducting heat) the zipper to both walls of the bag making film; a station for ultrasonically welding the zipper at regular package width intervals; a station for cross sealing (again using heat conduction) the zipper/film assembly at the same regular package width intervals to form side seals; and a station for cutting the zipper/film assembly along a midline of the zipper crush and the cross seal to sever a bag from the remainder of the film. In a known pre-made bag system, the film moves continuously through the zipper sealing station, but intermittently through the ultrasonic welding, cross sealing and cutting stations. This transition is effectuated by a synchronization section having motor-driven pinch rolls and a dancer assembly that converts continuous motion into start-stop motion.

Known pre-made bag systems of the above-described type can produce bags at a rate of 200 bags per minute. It would be desirable to increase the production rate of such pre-made bag systems. The limiting factor in speed is the time required to perform an ultrasonic crush of the zipper.

An apparatus for high-speed ultrasonic welding of zipper strips was disclosed in U.S. patent application Ser. No. 10/216,252 filed on Aug. 8, 2002 and entitled "Sealer with Continuous Motion Ultrasonic Zipper Welding". However, there is a continuing need for improvements in apparatus for ultrasonically welding zipper strips at high speeds.

BRIEF DESCRIPTION OF THE INVENTION

The invention is directed to a method and an apparatus for producing zippered bags at high speeds. The zipper comprises a pair of zipper strips that are welded at spaced intervals along the zipper during the automated production process. The zipper strips may be either flanged or flangeless. An ultrasonic welding station is disclosed comprising a non-rotating horn and a rotary anvil that cooperate to weld the zipper strips together at spaced intervals. The horn is substantially rigidly coupled to the end of a piston rod of an air cylinder. The air inside the cylinder cushions the deflection of the horn away from the anvil as the anvil rotates into a position where a plateau opposes a distal end of the horn. It is expected that this cushioning effect will alleviate the possibility of the zipper profiles being forced or deflected from a straight line, which could cause the creation of wrinkles and/or jams.

One aspect of the invention is a method comprising the following steps: (a) continuously moving first and second strips of thermoplastic material at the same linear speed along a path that passes between a non-rotary ultrasonic horn and a rotary anvil, the movement of these strips being such that respective successive sections of the strips pass between the horn and the anvil; (b) continuously rotating the anvil at a rate of angular rotation such that a contact portion of the anvil has a tangential velocity component equal to or approximately equal to the linear speed of the first and second strips during contact therewith; and (c) activating the ultrasonic horn to transmit ultrasonic wave energy at least during a period of time when the contact portion of the rotating anvil is generally opposite to the horn. The total amount of ultrasonic wave energy transmitted into adjacent portions of the first and second strips is sufficient to meld the adjacent portions together.

Another aspect of the invention is a method comprising the following steps: (a) intermittently moving first and second strips of thermoplastic material along a path that passes between a non-rotary ultrasonic horn and a rotary anvil, the intermittent movement of these strips being such that respective successive sections of the strips pass between the horn and the anvil, successive intermittent movements being separated in time by respective dwell times during which the first and second strips are not moving along the path; (b) intermittently rotating the anvil so that a contact portion of the anvil is at rest during at least a portion of each dwell time, the contact portion at rest being in contact with one of the first and second strips; and (c) activating the ultrasonic horn to transmit ultrasonic wave energy at least during the periods when the anvil is not rotating. Again, the total amount of ultrasonic wave energy transmitted into adjacent portions of the first and second strips is sufficient to meld the adjacent portions together.

A further aspect of the invention is an ultrasonic welding apparatus comprising: an ultrasonic horn comprising a distal end; a support member rigidly coupled to the horn and displaceable along an axis; a rotary anvil having an axis of rotation generally perpendicular to the axis of displacement of the support, the anvil comprising a periphery and a plateau projecting radially outward from the periphery, the plateau being opposed to and separated by a distance from the distal end of the horn when the rotary anvil is in a predetermined angular position; a transducer for converting electric potential differences into ultrasound wave energy, the horn being acoustically coupled to the transducer; drive means for causing the anvil to rotate; and a device that resists displacement of the support in a direction away from the anvil.

Yet another aspect of the invention is an apparatus for ultrasonically welding first and second zipper strips to each other at successive spaced-apart zones along the zipper strips, comprising: an ultrasonic horn comprising a distal end, the horn being displaceable along an axis; a rotary anvil having an axis of rotation generally perpendicular to the axis of displacement of the horn; a transducer for converting electric potential differences into ultrasound wave energy, the horn being acoustically coupled to the transducer; drive means for causing the anvil to rotate; and a device that resists displacement of the horn in a direction away from the anvil.

A further aspect of the invention is an apparatus comprising: an assembly for joining mutually interlocked first and second zipper strips to opposing sides of a folded web of film; an ultrasonic station for ultrasonically welding the first and second zipper strips to each other at successive spaced-apart zones along the zipper strips; and means for advancing the first and second zipper strips along a path that passes through the assembly and the ultrasonic station. The ultrasonic station comprises: a non-rotating device that transmits ultrasound wave energy from a distal end in response to electrical energy being supplied to a terminal thereof, the distal end being disposed adjacent a portion of the path, and the non-rotating device being displaceable along an axis that is generally perpendicular to the portion of the path; a rotary anvil having an axis of rotation generally perpendicular to a plane defined by the axis of displacement of the non-rotating device and the portion of the path adjacent the distal end, the anvil comprising a periphery having a portion that opposes the distal end of the non-rotating device when the anvil is in a predetermined angular position, respective portions of the first and second zipper strips being disposed between the opposing portion of the anvil and the distal end of the non-rotating device; drive means for causing the anvil to rotate; and a resistance device that resists displacement of the non-rotating device in a direction away from the anvil.

Another aspect of the invention is an ultrasonic welding apparatus comprising: an air cylinder comprising a piston rod; an ultrasonic horn substantially rigidly coupled to an end of the piston rod, the horn comprising a distal end; a rotary anvil having an axis of rotation generally perpendicular to an axis of the piston rod and comprising a periphery; a transducer for converting electric potential differences into ultrasound wave energy, the horn being acoustically coupled to the transducer; and drive means for causing the anvil to rotate. The distal end of the horn confronts the periphery of the anvil throughout rotation of the anvil.

Other aspects of the invention are disclosed and claimed below.

DETAILED DESCRIPTION OF THE INVENTION

Figure 1:
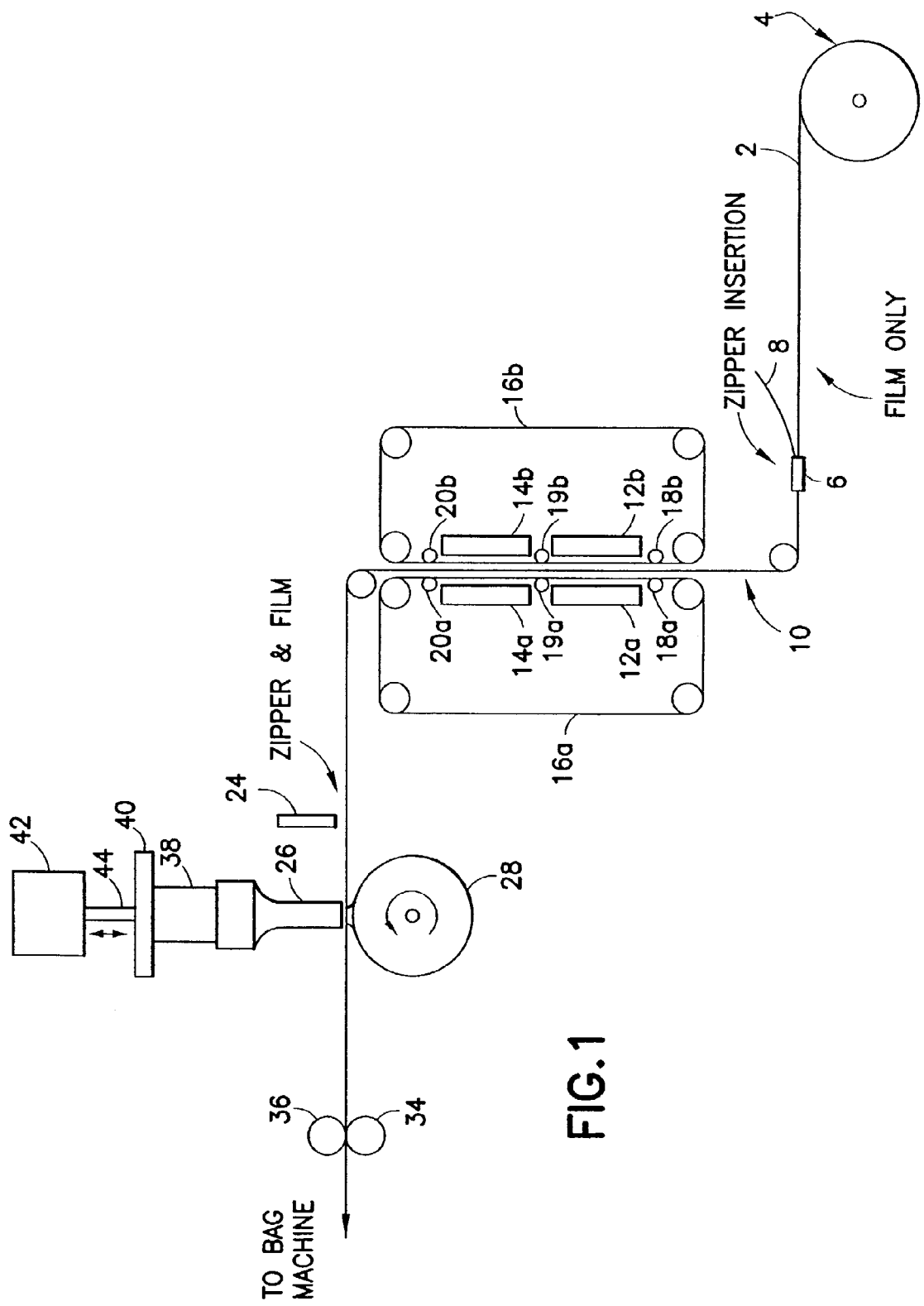
FIG. 1 is a drawing showing a side view of a continuous sealing machine having apparatus for continuous ultrasonic welding of zipper in accordance with one embodiment of the invention.
Figure 2:
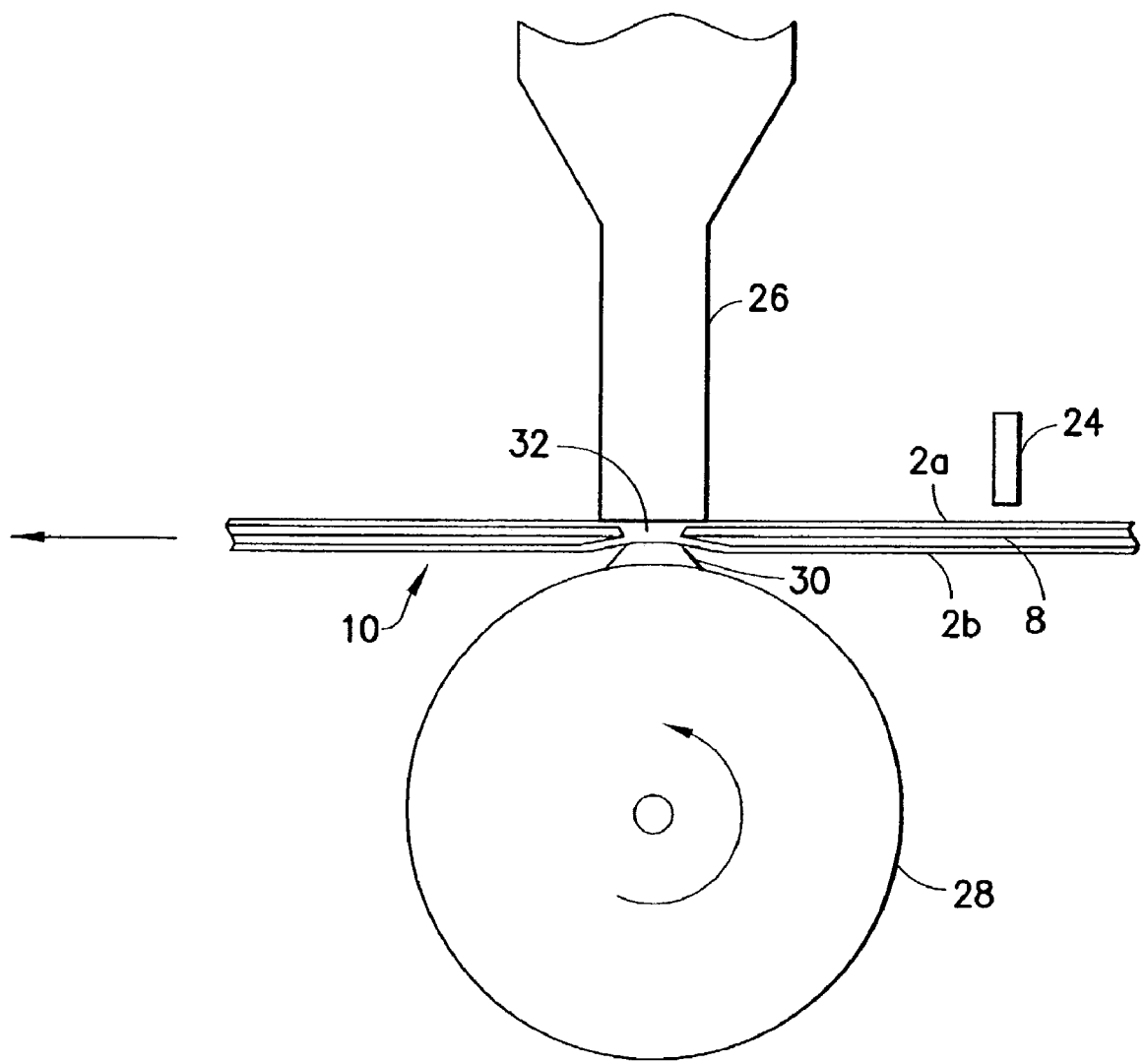
FIG. 2 is a drawing showing, on an enlarged scale, the elements for the ultrasonic welding apparatus incorporated in the sealing machine depicted in FIG. 1.

A method and an apparatus in accordance with one embodiment of the present invention will now be described with reference to FIGS. 1–3. FIG. 1 shows a zipper-to-film sealing apparatus and an ultrasonic welding apparatus that work in conjunction with a bag making machine. In particular, the sealing apparatus disclosed herein can be used in conjunction with a pre-made bag machine, i.e., a machine that makes bags but does not fill them. In this embodiment, the zipper and film move continuously outside the bag machine, but move intermittently inside the bag machine in a well-known manner. However, it should be appreciated at the outset that the present invention is not limited to use with continuously moving zipper and film, but may also be used to stomp zipper that moves intermittently. In the latter case, the ultrasonic welding apparatus can be moved from a station upstream from the dancer assembly (i.e., outside the bag machine) to a position downstream from the dancer assembly (i.e., inside the bag machine).

Referring to FIG. 1, a pre-folded web 2 of bag making film is paid out from a roll 4 and a zipper 8 is inserted between the walls of the folded web by a tape inserter 6. The zipper 8 comprises a pair of mutually interlockable zipper strips. The strips may be either flanged or flangeless. The zipper and folded web are then threaded through a sealing station (12a,b, 14a,b), an ultrasonic welding station (26, 28), and a pair of motor-driven pinch rolls 34 and 36. Typically the pinch rolls 34 and 36, which pull the film 2 through the sealing and ultrasonic welding stations, are part of the bag making machine. In that event, the zipper sealing station and the ultrasonic welding apparatus may be incorporated in a standalone unit. As an alternative to paying out a pre-folded web 2 of bag making film, film that is not folded can be wound on roll 4. In the latter case, a conventional folding board or plow would be installed between the roll 4 and the tape inserter 6.

The zipper 8 is unwound from a spool (not shown) and guided into position by the tape inserter 6, which comprises a channel having a cross-sectional profile shaped to maintain the orientation of the zipper 8 as it is fed toward the folded web 2. The outlet end of the tape inserter 6 is designed to separate the opposing edges of the folded web by a sufficient distance to allow the emerging zipper 8 to be inserted therebetween and in parallel with the opposing edges. Sets of opposing guide rollers may be provided at any points downstream of the tape inserter to maintain the position of the inserted zipper 8 in parallel with and sandwiched between the opposing walls of the folded web 4.

The folded web 2 and the zipper 8 are then advanced together through the vertical sealing apparatus comprising a first pair of opposing heated sealing bars 12a and 12b and a second pair of opposing heated sealing bars 14a and 14b. The sealing bars 12a and 14a are laterally displaceable, as are the sealing bars 14a and 14b, between respective extended and retracted positions. Sealing of the zipper to the folded web of bag making film occurs while the sealing bars are in their respective extended positions. The sealing bars are retracted as needed, e.g., during threading of the web and tape through the sealing apparatus prior to startup.

Although not shown in FIG. 1, each sealing bar may be mounted to a laterally displaceable seal bar mounting plate via a pair of threaded rods, while the seal bar mounting plate is in turn fastened to the ends of a pair of guide shafts respectively supported by a pair of flanged mount bearings. The flanged mount bearings sit atop and are fastened to a cylinder mounting plate. The force for displacing the sealing bar is provided by an air cylinder having a piston, the end of which is fastened to the middle of the seal bar mounting plate.

As the folded web 2 with inserted zipper 8 advances vertically and continuously between the opposing sets of sealing bars, the respective zipper strips are sealed to the opposing edges of the bag making film, thereby continuously attaching incoming sections of the moving zipper to adjoining sections of the moving web. The sealing is accomplished by electrically heating the sealing bars, the heat being conducted through respective endless barrier strips 16a and 16b made of Teflon or similar material, which circulate on respective sets of rollers. Teflon barrier strip 16a passes between one side of the folded web and the sealing bars 12a and 14a, while Teflon barrier strip 16b passes between the other side of the folded web and the sealing bars 12b and 14b. In the gaps between the opposing sealing bars, the web and zipper are sandwiched between and held together by the Teflon barrier strips 16a and 16b, which move with the web and zipper and prevent the bag making film from sticking against the stationary heated sealing bars during conduction heat sealing. The Teflon barrier strips and intervening web and zipper pass through the nips of a series of guide rollers respectively positioned in advance of the sealing bars (guide rollers 18a and 18b); in between the sealing bars (guide rollers 19a and 19b); and after the sealing bars (guide rollers 20a and 20b). It should be appreciated that for the sake of illustration, the Teflon barrier strips, the folded web and the sealing bars are shown in FIG. 1 with respective gaps between adjoining components, whereas in reality these components are in contact with each other when the sealing bars are in their extended positions. Likewise the nips formed by the opposing pairs of guide rollers have been shown in the drawing with gaps, when in actuality the Teflon barrier strips and the web with inserted zipper are pressed together in the nips and no gaps occur.

The amount of heat applied to the zipper strips can be controlled to avoid "seal-through" of the zipper strips or of the flanges thereof. Alternatively, the zipper strips can be guided past a separator plate that is interposed between the zipper strips (or their flanges) to prevent seal-through.

In one implementation, each sealing bar is about 6 inches long and the Teflon barrier strips are about 1.5 inches wide. Both the Teflon barrier strips 16a and 16b and the guide rollers 18a, 18b, 19a, 19b, 20a and 20b are disposed in the area of the zipper and do not extend the full height (i.e., the dimension transverse to the zipper) of the folded bag making film.

Although the embodiment shown in FIG. 1 has two sealing bars arranged in series on each side of the traveling web and zipper, any number of sealing bars can be used provided that sufficient heat is conducted into the zipper to cause the zipper flanges to seal to the bag making film.

It should be appreciated, however, that the ultrasonic welding apparatus disclosed herein is not limited in its application to use in the specific machine shown in FIG. 1. The zipper can be sealed to the bag making film using any known sealing system.

The zipper and folded web, which enter the sealing station unjoined, exit the sealing station joined together by permanent seals. The pinch rolls 34 and 36 (which form part of the bag making machine) continue to pull the joined zipper and web forward. On the way to the bag making machine, the joined zipper/film assembly pass through an ultrasonic welding apparatus comprising a non-rotating horn 26 and a rotary anvil 28, which are shown on a larger scale in FIG. 2. The contact surface at the distal end of the horn 26 may be flat (as seen in FIG. 2) or may be radiused (convex or concave). Typically, the horn is made of titanium or a material having similar ultrasound wave conduction and durability properties.

A photodetector 24 positioned in the vicinity of the rotary ultrasonic apparatus receives radiant energy that has been transmitted by a light source (not shown) and reflected off an opposing portion of the moving web of film. The web of film is marked at regular spaced intervals in the zone where the radiant energy from the light source impinges. The marks absorb the transmitted radiant energy, producing a distinctive electrical signal in the photodetector 24 each instant when a mark passes by. The time intervals between the detection signals corresponding to equally spaced marks on the film are a function of the speed of the film. In the continuous-motion mode, the output of detection signals from the photodetector 24 to a programmable controller (46 in FIG. 3) allows the latter to control the rotation of anvil 28 so that the periphery of the anvil has a tangential velocity component, during the welding portion of the work cycle, that is equal to or approximately equal to the linear speed of the moving zipper/web assembly. A person skilled in the art will appreciate that other detection means could be employed, instead of a photo-optical eye, to detect the speed of the moving film. For example, an encoder wheel that produces a number of signals or pulses every revolution may be placed so that its periphery engages the moving web of film and rotates due to the frictional force exerted by the moving film. The photo eye, in concert with the encoder, can be used to correctly place the crush on the zippered film.

In the embodiment depicted in FIG. 1, the horn 26 is acoustically coupled to an ultrasonic transducer 38. The ultrasonic apparatus is mounted on a movable frame (not shown) in order to register the weld or crush in the correct position on the zipper/bag film assembly. As best seen in FIG. 2, the rotary anvil 28 comprises a protuberance or plateau or land 30 that projects radially outward from a circular cylindrical peripheral surface. A weld 32 is made in the zipper/film assembly each time the protuberance 30 passes through the gap between the activated horn and the rotating anvil, thereby pressing the zipper/film assembly against the activated horn.

The ultrasonic welding apparatus further comprises an air cylinder 42 having a piston with a rod 44, which is axially displaceable relative to the cylinder. The cylinder 42 is fixedly supported by a support frame not shown in FIG. 1. A plate or other mounting structure 40 is connected to the end of the piston rod 44. The ultrasonic transducer 38 (with horn 26 coupled thereto) is attached to the mounting plate 40 by means of conventional clamps (not shown) or other secure attachment means. During ultrasonic welding, the air pressure inside the cylinder is maintained substantially constant, so that the piston does not reciprocate. The preset air pressure inside the cylinder 42 has a cushioning effect as the anvil 28 rotates into its angular position where plateau 30 opposes the distal end of the horn. This alleviates the possibility of the zipper profiles being forced or deflected away from a straight line, which would tend to create wrinkles and/or jams.

Referring again to FIG. 2, the zipper 8 and adjoining portions 2a, 2b of the web are pressed between the protuberance 30 and the activated horn 26, thereby acoustically coupling the thermoplastic material of the zipper and film to the contact surface on the distal end of the horn. The amplitude of the acoustic wave energy must be sufficient to cause the thermoplastic material of the zipper strips in the zone between the horn and anvil to soften or melt, thereby forming a permanent seal 32 when the fused material is cooled. When the protuberance or plateau 30 is not in the gap between the horn and the anvil, there is sufficient clearance for the zipper and folded web to pass through the gap without the need to match the tangential speed of the anvil to the linear speed of the moving tape/web assembly.

Although not shown in the drawings, it should be understood that the zones of joinder formed in the zipper ultrasonically will be bisected in the bag machine during cutting of the zipper and film to form individual bags.

The plateau 30 pressing the zipper and film in the nip of the rotary ultrasonic apparatus establishes the acoustic coupling of the activated horn to the zipper material. During rotation of the anvil at a constant speed, the plateau 30 will land on the continuously moving zipper at equally spaced intervals along its length. Instead of a single protuberance or plateau, two or more protuberances or plateaus spaced at equal angular intervals on the periphery of the rotary anvil can be provided.

Female knurls may be formed on the contacting surface of the plateau 30 to provide grooves for the thermoplastic material to flow into during welding, rather than being squeezed out the sides. The distal end of the horn 26 may also be provided with female knurls to serve the same purpose.

Figure 3:
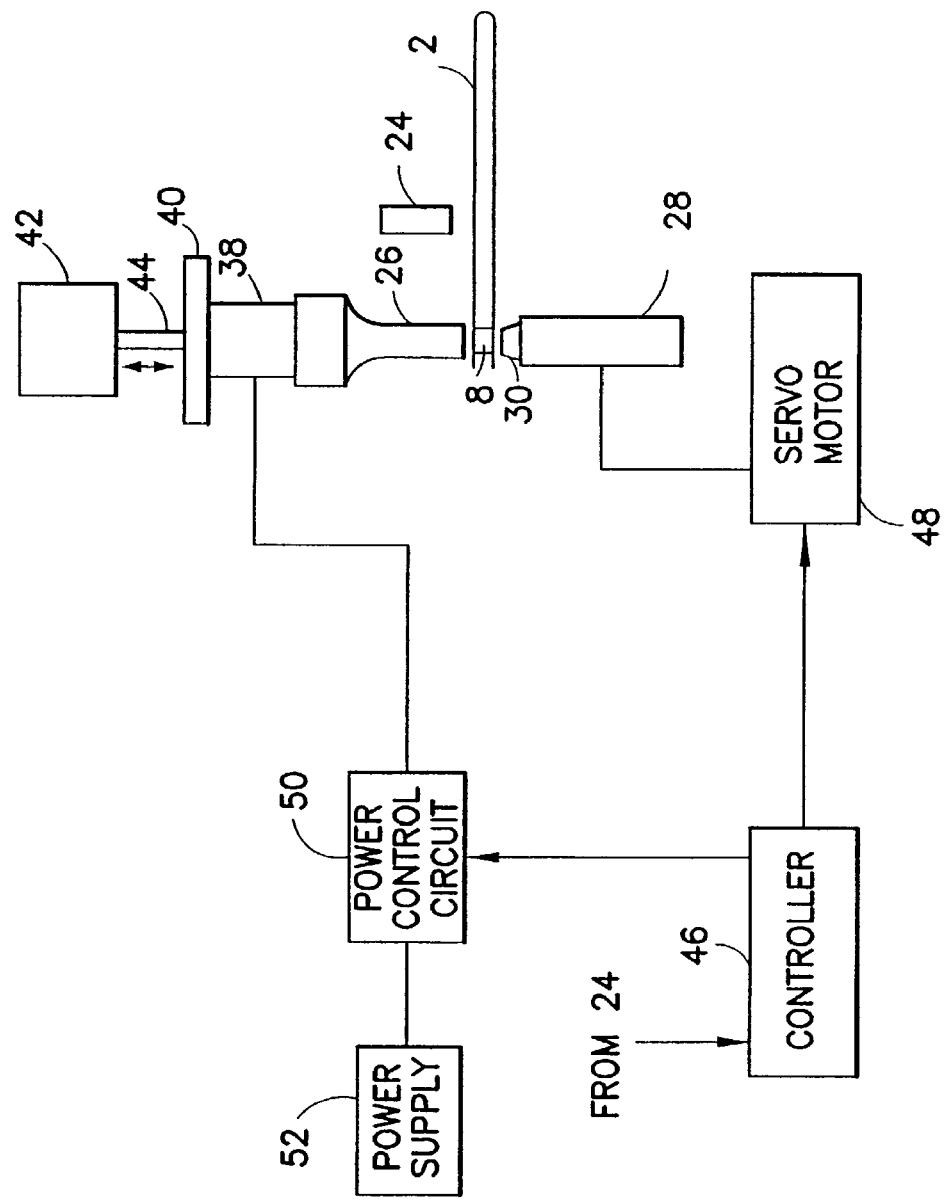
FIG. 3 is a block diagram depicting additional components of the ultrasonic welding apparatus in accordance with the embodiment depicted in FIG. 2.

In accordance with the embodiment depicted in FIG. 3, the anvil 28 is driven to rotate by a servomotor 48. However, many other types of motors, such as AC motors, DC motors, stepper motors, air motors, etc. and other types of driving devices could be used to drive the anvil rotation. The servomotor 48 is controlled by a programmable controller 46 so that rotation of the anvil follows the speed of the film, i.e., the controller 46 issues control signals to the servomotor 48 that are a function of the signals received from the photodetector 24 (or other detecting device). Basically, the photodetector 24 outputs a respective signal when each one of a multiplicity of indicators or marks (printed or formed at spaced intervals on the film) enters the field of view of the photodetector. These signals thus indicate the position of the film, while the intervals separating successive signals indicate the speed of the film.

Based on the film position or speed indicating signals, the controller 46 can control the ultrasonic welding apparatus to operate in any one of three different modes. In each mode, the controller 46 controls both the servomotor 48 (for controlling the angular position of the anvil 28) and a power control circuit 50 (for controlling energization of the ultrasonic transducer 38 and, consequently, activation of the horn 26 that is acoustically coupled to the transducer). When the controller 46 turns the power control circuit 50 on, the power control circuit 50 connects the ultrasonic transducer 38 to the electrical power supply 52, causing the horn 26 to transmit ultrasound wave energy. When the controller 46 turns the power control circuit 50 off, the power control circuit 50 disconnects the ultrasonic transducer 38 from the electrical power supply 52 and the horn no longer transmits ultrasound wave energy.

In the continuous-motion mode, the controller 46 controls the servomotor 48 such that the anvil 28 rotates continuously at a rotational speed that results in the plateau on the periphery of the anvil having a tangential speed substantially equal to the linear speed of the zipper/film assembly in the vicinity of the horn. After ultrasonic welding, the sealed and ultrasonically welded zipper/film assembly travels to a pre-made bag machine (not shown). The tape/film assembly moves intermittently through cross sealing and cutting stations of the bag machine. The transition from continuous motion in the sealing machine to intermittent motion in the bag machine is effectuated by a synchronization section having motor-driven pinch rolls 34 and 36 (see FIG. 1) and a dancer assembly (not shown) that converts continuous motion into start-stop motion. In addition to the above, optionally the synchronization section has some device to further reduce the thickness of the welded material to facilitate the subsequent cutting operation using a hot knife.

Alternatively, ultrasonic welding apparatus can be moved inside the bag machine, i.e., at a position upstream from the dancer assembly, in which case the zipper/film assembly is moved intermittently through the ultrasonic welding station. Each time the zipper/film assembly is stopped, the horn is activated to weld the zipper strips together. In the two intermittent-motion modes, the controller 46 controls the servomotor 48 such that the anvil 28 rotates and then comes to a stop at an angular position where the plateau on the periphery of the anvil is in confronting relationship to the distal end of the horn. The stoppage in anvil rotation is timed to occur during a time interval when the zipper/film assembly is stopped, i.e., during a dwell time. Starting and stopping of the zipper/film assembly may be controlled by a master controller (not shown). In one of the two intermittent-motion modes, the controller 46 activates the horn 26 during the time interval when the anvil 28 is not rotating. In the other intermittent-motion mode, the controller 46 activates the horn 26 during a time interval that begins before the anvil 28 has come to a complete stop and that continues until after the anvil has resumed its rotation. In the latter mode, an increased amount of ultrasonic wave energy can be applied to the zipper and film without increasing the time period during which the anvil is stopped (i.e., without increasing the zipper/film dwell time). Preferably the anvil 28 comes to rest during each work cycle and does not move until the controller 46 receives a trigger signal from the photodetector 24.

The invention is not limited in its application to pre-sealing of zipper strips for reclosable packaging, but rather may be generally used to join two plastic strips or sheets together at spaced intervals.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the disclosure and claims, the term "fluid" includes both gases (such as air) and liquids.

The invention claimed is:

1. A method comprising the following steps:
    (a) continuously moving first and second strips of thermoplastic material at the same linear speed along a path that passes between an ultrasonic horn and a rotary anvil, the movement of said first and second strips being such that respective successive sections of said first and second strips pass between said horn and said anvil, wherein said first and second strips comprise respective interlockable profiles that are interlocked with each other;
    (b) continuously rotating said anvil at a rate of angular rotation such that a contact portion of said anvil has a tangential velocity component equal to or approximately equal to said linear speed of said first strip and second strips during contact therewith; and
    (c) activating said ultrasonic horn to transmit ultrasonic wave energy at least during a period when said contact portion of said rotating anvil is generally opposite to said horn, the total amount of ultrasonic wave energy transmitted into adjacent portions of said first and second strips being sufficient to meld said adjacent portions together in regions that are spaced at regular intervals longitudinally along said first and second strips, wherein said horn does not rotate about a pivot point during activation, and said horn and anvil do not form any melded regions that are laterally displaced relative to said melded regions along said first and second strips.

2. The method as recited in claim 1, further comprising the step of cushioning deflection of said horn when said contact portion of said rotating anvil is opposite to said horn.

3. The method as recited in claim 1, further comprising the steps of:
   (d) continuously moving a flexible web of film along a path; and
   (e) sealing said moving first and second strips to said moving web of film.

4. The method as recited in claim 3, further comprising the step of detecting the speed of said moving web and controlling the rate of rotation of said anvil as a function of the detected speed.

5. The method as recited in claim 3, wherein said sealing step comprises conduction heat sealing.

6. The method as recited in claim 3, further comprising the steps of folding said web of film and guiding said moving first and second strips so that respective successive sections of said first and second strips are inserted between opposing portions of successive sections of said folded web, said first and second strips being respectively sealed to said opposing portions of said web of film during step (e).

7. A method comprising the following steps:
   (a) intermittently moving first and second strips of thermoplastic material along a path that passes between an ultrasonic horn and a rotary anvil, the intermittent movement of said first and second strips being such that respective successive sections of said first and second strips pass between said horn and said anvil, successive intermittent movements being separated in time by respective dwell times during which said first and second strips are not moving along said path, wherein said first and second strips comprise respective interlockable profiles that are interlocked with each other;
   (b) intermittently rotating said anvil so that a contact portion of said anvil is at rest during at least a portion of each dwell time, said contact portion at rest being in contact with one of said first and second strips; and
   (c) activating said ultrasonic horn to transmit ultrasonic wave energy at least during the periods when said anvil is not rotating, the total amount of ultrasonic wave energy transmitted into adjacent portions of said first and second strips being sufficient to meld said adjacent portions together in regions that are spaced at regular intervals longitudinally along said first and second strips, wherein said horn does not rotate about a pivot point during activation, and said horn and anvil do not form any melded regions that are laterally displaced relative to said melded regions along said first and second strips.

8. The method as recited in claim 7, further comprising the step of cushioning deflection of said horn when said contact portion of said anvil is opposite to said horn.

9. The method as recited in claim 7, further comprising the steps of:
   (d) intermittently moving a flexible web of film along a path; and
   (e) sealing said first and second strips to said web of film during dwell times.

10. The method as recited in claim 9, further comprising the step of detecting movement of said web and controlling the rotation of said anvil as a function of the movement of said web.

11. The method as recited in claim 9, wherein said sealing step comprises conduction heat sealing.

12. The method as recited in claim 7, wherein said horn is activated continuously during an interval of time that begins before said anvil stops rotating and after said anvil has resumed its rotation.

* * * * *